(12) United States Patent
Schuberth et al.

(10) Patent No.: US 10,513,262 B2
(45) Date of Patent: Dec. 24, 2019

(54) METHOD FOR OPERATING A MOTOR VEHICLE AND MOTOR VEHICLE

(71) Applicant: AUDI AG, Ingolstadt (DE)

(72) Inventors: Stefan Schuberth, Gaimersheim (DE); Florian Brücklmaier, Mainburg (DE); Torsten Hafer, Wettstetten (DE); Stefanie Edler, Karlshuld (DE)

(73) Assignee: Audi AG, Ingolstadt (DE)

( * ) Notice: Subject to any disclaimer, the term of this patent is extended or adjusted under 35 U.S.C. 154(b) by 242 days.

(21) Appl. No.: 15/544,864

(22) PCT Filed: Jan. 21, 2016

(86) PCT No.: PCT/EP2016/000104
§ 371 (c)(1),
(2) Date: Jul. 19, 2017

(87) PCT Pub. No.: WO2016/116276
PCT Pub. Date: Jul. 28, 2016

(65) Prior Publication Data
US 2017/0369059 A1    Dec. 28, 2017

(30) Foreign Application Priority Data

Jan. 24, 2015   (DE) .................. 10 2015 000 856

(51) Int. Cl.
*B60W 30/14*     (2006.01)
(52) U.S. Cl.
CPC ..... *B60W 30/143* (2013.01); *B60W 2520/125* (2013.01); *B60W 2520/14* (2013.01);
(Continued)
(58) Field of Classification Search
CPC ... B60W 30/14; B60W 30/143; B60W 30/146
See application file for complete search history.

(56) References Cited

U.S. PATENT DOCUMENTS

| 8,204,665 B2 | 6/2012 | Takeuchi et al. |
| 8,855,874 B2 | 10/2014 | Eriksson et al. |

(Continued)

FOREIGN PATENT DOCUMENTS

| CN | 101439676 A | 5/2009 |
| CN | 102256854 A | 11/2011 |

(Continued)

OTHER PUBLICATIONS

International Search Report and Written Opinion of the International Searching Authority directed to related International Patent Application No. PCT/EP2016/000104, dated Jun. 8, 2016, with attached English-language translation; 20 pages.

(Continued)

*Primary Examiner* — Anshul Sood
(74) *Attorney, Agent, or Firm* — Sterne, Kessler, Goldstein & Fox P.L.L.C.

(57) ABSTRACT

Method for operating a motor vehicle (1), comprising a navigation device (2) having at least one stored item of route information describing a route section and a cruise control system (3) that adjusts an actual speed of the motor vehicle (1) to a stored target speed determined as a function of the stored item of route information by controlling a drive (5) or a braking device (6) of the motor vehicle (1), wherein the navigation device (2) is supplied with at least one changed item of route information relating to the changed route section, and the cruise control system (3) adjusts the actual speed of the motor vehicle (1) as a function of at least one evaluation parameter, on the basis of which a traversal of the changed route section (15) earlier in time is qualified, either to the stored target speed determined as a function of the stored item of route information or to a changed target speed determined as a function of the changed item of route information.

20 Claims, 3 Drawing Sheets

Figure 1:
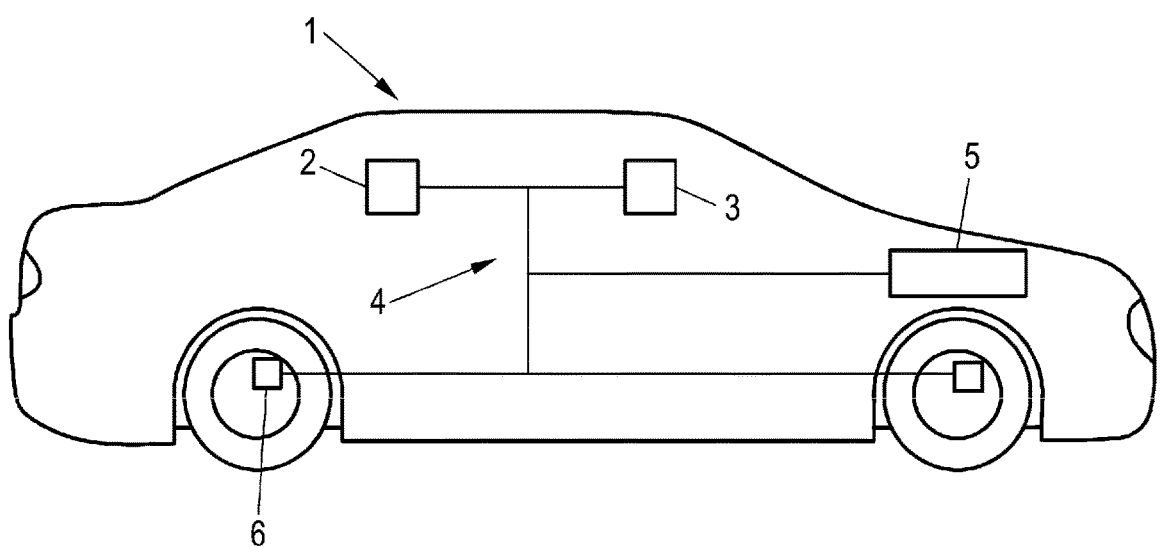

(52) U.S. Cl.
CPC . *B60W 2550/142* (2013.01); *B60W 2550/146* (2013.01); *B60W 2550/302* (2013.01); *B60W 2550/402* (2013.01); *B60W 2710/18* (2013.01); *B60W 2720/10* (2013.01); *B60W 2750/40* (2013.01)

(56) References Cited

U.S. PATENT DOCUMENTS

| | | | |
|---|---|---|---|
| 8,996,273 | B2 | 3/2015 | Lee et al. |
| 9,358,962 | B2 | 6/2016 | Zambou |
| 2006/0229792 | A1* | 10/2006 | Kawazoe ............... B60W 30/16 701/93 |
| 2013/0138319 | A1* | 5/2013 | Schuberth ........... B60W 30/143 701/93 |
| 2014/0207357 | A1* | 7/2014 | Shimotani ........ G08G 1/096725 701/93 |
| 2015/0106007 | A1* | 4/2015 | Matsumura ......... B60W 30/143 701/408 |

FOREIGN PATENT DOCUMENTS

| | | |
|---|---|---|
| CN | 103857550 A | 6/2014 |
| CN | 103921788 A | 7/2014 |
| DE | 103 15 047 A1 | 10/2004 |
| DE | 10 2005 049 458 A1 | 4/2007 |
| DE | 10 2008 025 707 A1 | 12/2009 |
| DE | 10 2011 112 382 A1 | 3/2013 |
| DE | 10 2013 216 705 A1 | 3/2014 |
| DE | 10 2012 218 100 A1 | 4/2014 |
| DE | 10 2013 011 538 A1 | 1/2015 |
| EP | 1 045 224 A2 | 10/2000 |
| EP | 1 870 674 A2 | 12/2007 |
| EP | 2 062 797 A2 | 5/2009 |
| EP | 2 529 993 A1 | 12/2012 |

OTHER PUBLICATIONS

International Preliminary Report on Patentability directed to related International Patent Application No. PCT/EP2016/000104, with attached English-language translation, dated Jul. 25, 2017; 15 pages.

* cited by examiner

METHOD FOR OPERATING A MOTOR VEHICLE AND MOTOR VEHICLE

The invention relates to a method for operating a motor vehicle, comprising a navigation device having at least one stored item of route information describing a route section and a cruise control system that adjusts an actual speed of the motor vehicle to a stored target speed determined as a function of the stored item of route information by controlling a drive or a braking device of the motor vehicle.

Driver assistance systems that assist a driver of a motor vehicle with observing a maximum permissible speed valid on a route section or adjusting an actual speed of the motor vehicle to the maximum permissible speed are known. The driver can set a target speed of the motor vehicle, to which the actual speed of the motor vehicle is adjusted. Systems that adjust the actual speed of the motor vehicle as a function of a pending change of the target speed to a maximum permissible speed or by changing the target speed due to the course of the road are also known.

For this purpose, it is possible that at least the curve radius is taken from the stored route information, to determine a target speed of the motor vehicle that is suitable for the curve. This can be disadvantageous in some cases because certain influencing factors cannot be detected solely by the course of the road or the curve radius. For example, no information is provided on how wide the road is, how visible the road is, or whether there are other potential risks—for example, due to construction at the edge of the road.

Another disadvantage of the systems known from the prior art is that changed route information must be made available to the cruise control system when a new item of route information, e.g., a new navigation map, is issued. For this purpose, the changed route sections must usually be driven on in a reference run so as to make the changed route information available, which is inconvenient.

It is therefore the aim of the present invention to specify a method that makes it possible to easily validate changed route information.

In the case of a method of the type mentioned at the outset, this aim is achieved according to the invention in that the navigation device is supplied with at least one changed item of route information relating to the changed route section, and the cruise control system adjusts the actual speed of the motor vehicle as a function of at least one evaluation parameter, on the basis of which a traversal of the changed route section earlier in time is qualified, either to the stored target speed determined as a function of the stored item of route information or to a changed target speed determined as a function of the changed item of route information.

In the context of this application, the term "cruise control system" refers to a device that adjusts the actual speed of the motor vehicle to a specified target speed or a temporary speed by intervening in a drive or a braking device of the motor vehicle. Devices that, for example, enable adaptive cruise control, such as an ACC system (Adaptive Cruise Control), are also regarded as cruise control systems. An ACC system is a further development of a cruise control system. In the context of this patent application, the term "drive" is used for a drive device of the motor vehicle—for example, an internal combustion engine or an electric motor.

The invention is thus based upon the finding that the navigation device is supplied with a changed item of route information that deviates from the item of route information stored in the navigation device. According to the invention, it is possible to decide—as a function of the evaluation parameter, by means of which the changed route section, which relates to the changed item of route information, is described and which is qualified on the basis of a traversal earlier in time—whether the target speed of the motor vehicle is adjusted as a function of the stored item of route information or the changed item of route information. This is advantageous because the evaluation parameter can be used to decide whether a changed item of route information and the resulting changed target speed are advantageous for the motor vehicle—in particular, in accordance with the wishes of the user of the motor vehicle. The traversal earlier in time refers to a traversal of the corresponding route section that was carried out at a point in time before an instantaneously imminent traversal of the corresponding route section. This evaluation parameter is used to evaluate the changed item of route information relating to the changed route section, so as to determine whether a change of the stored item of route information and the resulting stored target speed makes sense for the user or the respective motor vehicle.

The evaluation parameter can preferably be created as a function of a traversal of the changed route section by the driver's own motor vehicle or another motor vehicle or several other motor vehicles. In the case of a traversal by another motor vehicle or several other motor vehicles, the evaluation parameter is transmitted to the driver's own motor vehicle. In the case of a traversal of the changed route section by the driver's own vehicle, it may be provided, in particular, that the user of the motor vehicle have the option of entering the evaluation parameter after the traversal and thus accepting or rejecting the changed item of route information and the resulting changed target speed, or assessing them in terms of driving comfort.

It is also possible that the evaluation parameter is created by another motor vehicle that traversed the corresponding route section beforehand, and the evaluation parameter created as a result. Another possibility is that several other motor vehicles traversed the changed route section at a point in time before the ego vehicle. As a result, there are a lot of data that can serve as evaluation parameters. In particular, an average speed can be figured for all motor vehicles that have traversed the corresponding route section. It is preferably also possible here to weight the individual traversals by the several other motor vehicles, so as to weight evaluation parameters that were created based upon instantaneous events less heavily and thus obtain an evaluation parameter representative of the route section. For example, a traversal by a motor vehicle in front of which a slow road user is located can be weighted less heavily than a traversal by another motor vehicle that is able to travel freely during the traversal. If the evaluation parameter were determined as a function of the motor vehicle that has a slow road user in front of it, the target speed determined for the route section as a result would unnecessarily be set too low. This is avoided by weighting the evaluation parameters created by the several other vehicles, as well as using a large number of data collections.

For the evaluation parameter created by the one other motor vehicle or the several other motor vehicles to be utilized in the driver's own motor vehicle, it must be transmitted to the driver's own vehicle. By transmitting the evaluation parameters from at least one other motor vehicle, the driver's own motor vehicle is already able to decide whether the relevant route section is to be traversed at the changed target speed or the stored target speed, before a first traversal of a changed route section. In particular, it can be provided that a direct acceptance of the changed item of route information can be carried out in the case of a small deviation in the changed item of route information with respect to the stored item of route information, or, in particular, in the resulting changed target speed relative to the stored target speed for the relevant route section, because it can be assumed that the slight change is still in the range of what the driver finds comfortable.

For the qualification of the changed route section, the evaluation parameter can particularly preferably comprise a lateral acceleration of the motor vehicle and/or a yaw rate of the motor vehicle and/or a—preferably weighted—average speed of the several other motor vehicles—preferably measured by a sensor of the motor vehicle—and/or an input by a user of the motor vehicle. If the evaluation parameter comprises a lateral acceleration of the motor vehicle and/or a yaw rate of the motor vehicle, it should also be noted that they were detected during an earlier traversal of the changed route section and result in a changed target speed that is lower with respect to the stored target speed and was detected due to a cause for a reduction in the actual speed of the motor vehicle. A slower road user can be mentioned as an example here. A reduction in the target speed therefore only makes sense when a corresponding cause is present. Accordingly, only an increase in the lateral acceleration of the motor vehicle and/or the yaw rate of the motor vehicle is a meaningful evaluation parameter, because it can only be assumed that the changed target speed can be increased with respect to the stored target speed.

Particularly preferably, a—preferably weighted—average speed of the several other motor vehicles can be used as an evaluation parameter. This average speed, which is determined from a traversal by several other motor vehicles, automatically takes into consideration all factors that are necessary for an optimum curve speed. In particular, factors are to be taken into consideration here that are not taken into consideration in the commonly used route information of a navigation system, such as special road geometry, a gradient of the road, the road width, visibility of the road area, and construction at the edge of the road.

The weighting of the average speed is to be understood as meaning that evaluation parameters from traversals at very low or very high speeds and/or with very low or very high sensor values, e.g., of the lateral acceleration, are weighted lower than the evaluation parameters from traversals that are around an average value. Furthermore, a preceding vehicle can be detected via a driving environment sensor system. In this case, it can be assumed that the driver may have wanted to drive at a different speed through the relevant route section. Particularly preferably, it is possible to use traversals that were carried out in the absence of a cruise control system, because the new speed distribution is more meaningful and, otherwise, only the speed determined by the cruise control system can be validated.

In particular, it is preferred that the evaluation parameter comprise an input by a user of the motor vehicle. This form of the evaluation parameter is considered a meaningful form of the evaluation parameter. Here, the user can directly input into a control device and/or the navigation device and/or the cruise control system whether the traversal of the relevant route section was comfortable or not, e.g., using an input device of the motor vehicle, after an early traversal of the changed route section has ended. The user can thus directly determine and enter the evaluation parameter. It can also be provided that the user can change the stored target speed for the next traversal of the corresponding route section. In particular, he/she can determine whether the route section should be traversed faster or slower during the next traversal.

A preferred embodiment of the invention provides that the changed target speed correspond to the—preferably weighted—average speed of the several other motor vehicles. As explained above, it is particularly advantageous that the average speed of the several other motor vehicles is used to determine the target speed for a corresponding route section. In particular, it is advantageous to use the average speed directly as a changed target speed and adjust the actual speed of the motor vehicle to this target speed.

For the further adaptation of the method according to the invention to various driving behaviors of users of motor vehicles, at least two driver-specific items of type information can be stored in the cruise control system and/or a control device of the motor vehicle. Various changed target speeds that are determined from a speed distribution that is created by the several other motor vehicles by means of a traversal of the corresponding route section are assigned to these items of type information. Accordingly, several driver profiles or driver types can be created that are stored in the cruise control system or in the control device of the motor vehicle. Depending upon an item of type information selected, e.g., by a user, the actual speed of the motor vehicle is adjusted to a corresponding changed target speed. The latter can be determined from the speed curve that was created by the several other motor vehicles when they traversed the corresponding route section. Depending upon the driving style of a user, he/she can select a corresponding item of type information, and thus a driver profile, that he/she finds comfortable, thereby obtaining a target speed that is pleasant for or desired by him/her.

To achieve this, a certain value of the speed distribution can be used for the various items of type information or driver profiles. For example, a changed target speed that is in the medium range or below the average speed of the speed distribution can be assigned to a comfort-loving driver. For a sporty driving style, a profile can be stored, and, when it is selected, a changed target speed is adjusted. This can correspond to, for example, the 97th percentile of the speed distribution. These values are, of course, only to be understood as examples. The user can ultimately determine the target speed he/she deems most suitable from the speed curve on his/her own. In particular, the various items of type information or driver profiles can be linked to various operating modes of the motor vehicle. When a sports mode or comfort mode is selected, the corresponding item of type information, and thus the corresponding changed target speed, can simultaneously be selected.

In a further embodiment of the method according to the invention, it can also be provided that, with respect to a curvature usually stored in the route information or a stored curve radius, the stored and/or the changed item of route information comprise a road width and/or a road grade and/or a curve radius and/or construction at the edge of a roadway. This makes it possible to use the items of route information to determine changed speeds that take several influencing factors into account.

A further development of the method according to the invention provides that, if the changed item of route information and/or the stored item of route information comprises multiple partial items of information, changing the stored item of route information to the changed item of route information and/or supplementing the stored item of route information with the changed item of route information is done only selectively, with respect to at least one partial item of information. Accordingly, the stored item of route information can be supplemented, on the one hand, by at least one partial item of information containing the changed item of route information, if it is validated on the basis of the evaluation parameter. Furthermore, it is also possible to selectively change only individual partial items of information and retain the remaining partial items of information if both the stored item of route information and the changed item of route information include several partial items of information. This has the advantage that, if there is a changed item of route information, which comprises several partial items of information, e.g., a location of a curve, a curve speed, and a road gradient, and the corresponding stored item of route information includes only a curve speed, which is, however, preferred over the changed item of route information, only the changed curve location and the changed road gradient are added to the stored item of route information. However, the changed curve speed may be rejected, because the user of the motor vehicle prefers the stored curve speed. As described above, it is preferred that the evaluation parameter be transmitted to the driver's own vehicle if the evaluation parameter is created by another vehicle or several other vehicles. The changed item of route information can also be transmitted to the driver's own vehicle. This transmission is particularly preferably carried out by a vehicle ad hoc network—for example, Car2x and/or radio and/or a data carrier and/or transmission from a server. The evaluation parameter or changed item of route information can thus be sent to the navigation device and/or the cruise control system of the motor vehicle.

A further development of the method according to the invention provides that an instantaneously valid target speed and/or a target speed valid for an adjacent route section be displayed on a display device of the motor vehicle. This has the advantage that the user of the motor vehicle can understand at any time, based upon the target speed displayed on the display device of the motor vehicle, the target speed to which the actual speed of the motor vehicle is currently being adjusted. In addition, the user of the motor vehicle gets information about the target speed to which the actual speed of the motor vehicle is adjusted for the route section adjacent to the route section currently being traveled. This makes sense if, for example, the motor vehicle approaches a curve, and the user of the motor vehicle would like to find out in advance the target speed at which the curve will be traversed. This, then, provides the user with the possibility of correcting the displayed speed if he/she deems it inappropriate for the curve ahead.

Particularly preferably, the changed target speed and/or the stored target speed can be changed at any time by a user of the motor vehicle. For this purpose, the user can change the stored target speed there saved, or a transmitted changed target speed, according to his/her wishes, e.g., in a vehicle menu of the motor vehicle.

In addition to this, the invention relates to a motor vehicle, comprising a navigation device having at least one stored item of information describing a route section and a cruise control system that is designed to adjust an actual speed of the motor vehicle to a stored target speed determined as a function of the stored item of route information by controlling a drive or a braking device of the motor vehicle, wherein it is possible to supply the navigation unit with at least one changed item of route information relating to the changed route section, and the cruise control system is designed to adjust the actual speed of the motor vehicle as a function of at least one evaluation parameter, on the basis of which a traversal of the changed route section earlier in time is qualified, either to the stored target speed determined as a function of the stored item of route information or to a changed target speed determined as a function of the changed item of route information.

Of course, all of the aforementioned method steps also apply to the motor vehicle when extrapolated, and all details and features of the motor vehicle also apply to the method.

Figure 2:
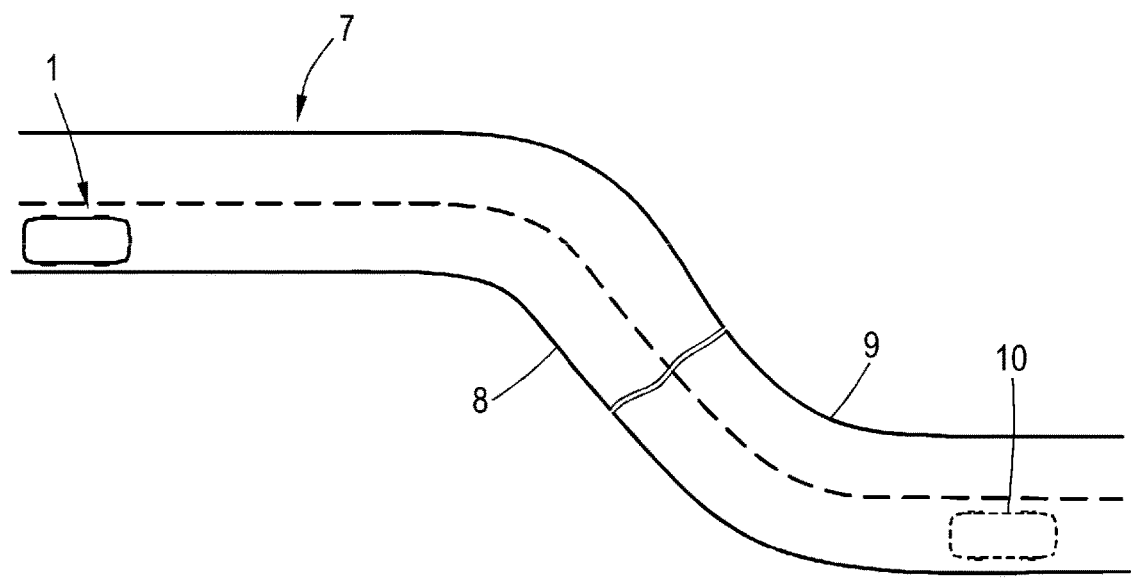
Figure 3:
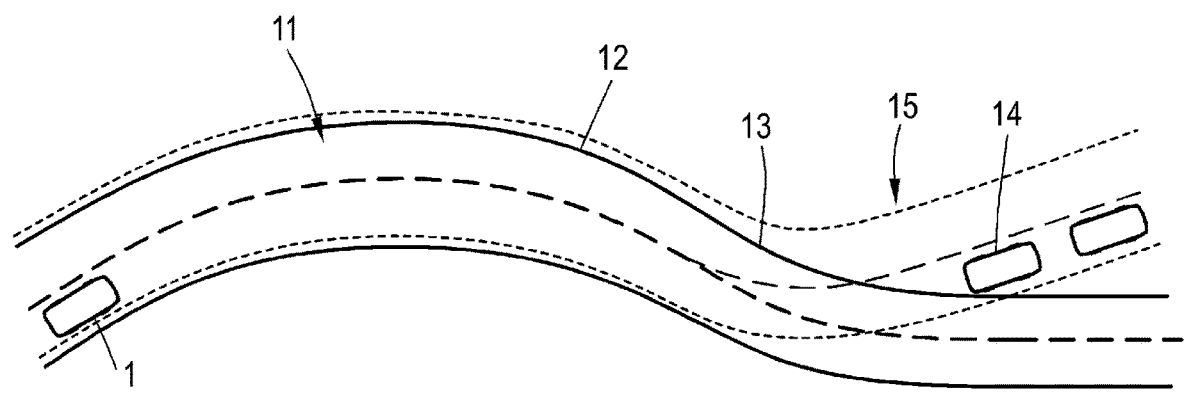
Figure 4:
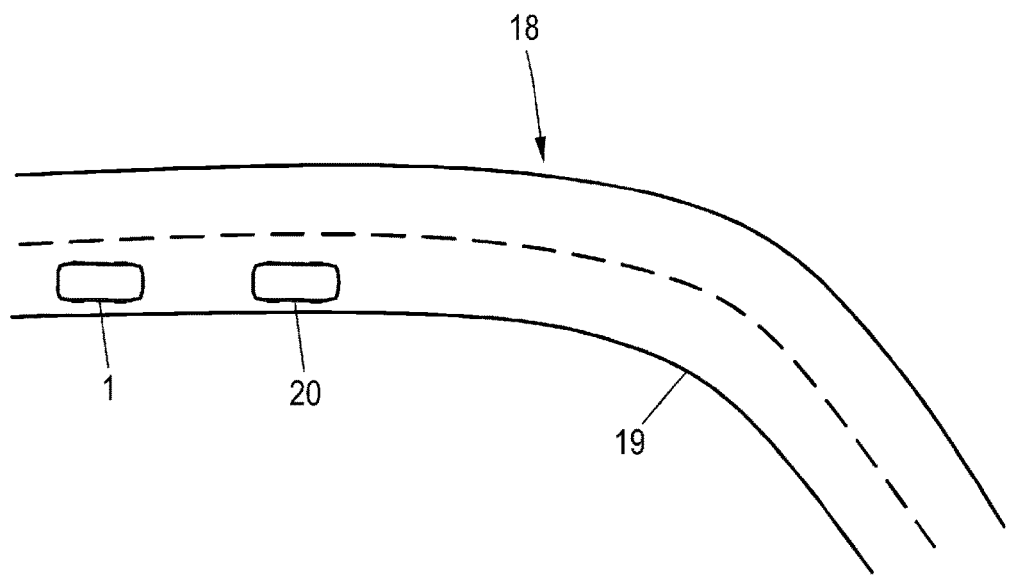
Figure 5:
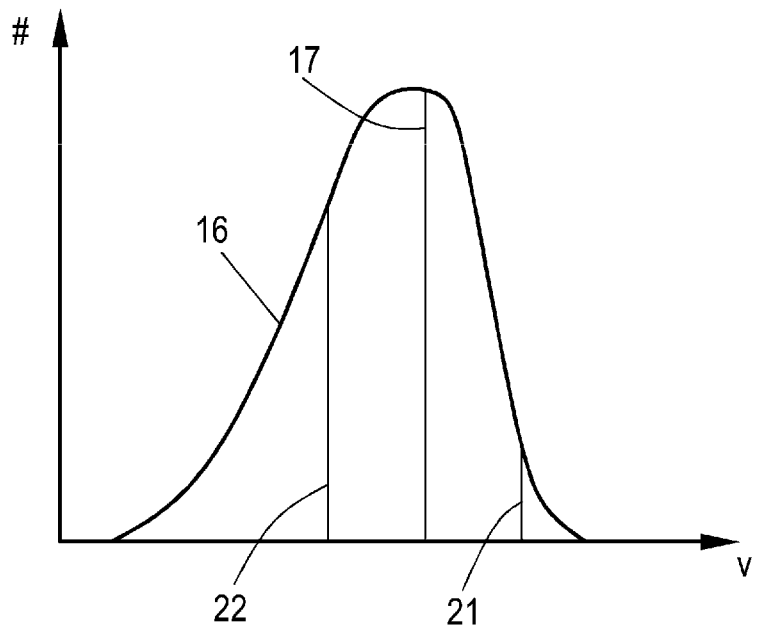

Further advantages and details of the invention will be explained below on the basis of exemplary embodiments with reference to the drawings. The drawings are schematic representations and show:

FIG. 1 a side view of a vehicle according to the invention;

FIG. 2 the vehicle according to the invention from FIG. 1 in a first traffic situation;

FIG. 3 the vehicle according to the invention from FIG. 1 in a second traffic situation;

FIG. 4 the vehicle according to the invention from FIG. 1 in a third traffic situation;

FIG. 5 a diagram of a created speed distribution; and

Figure 6:
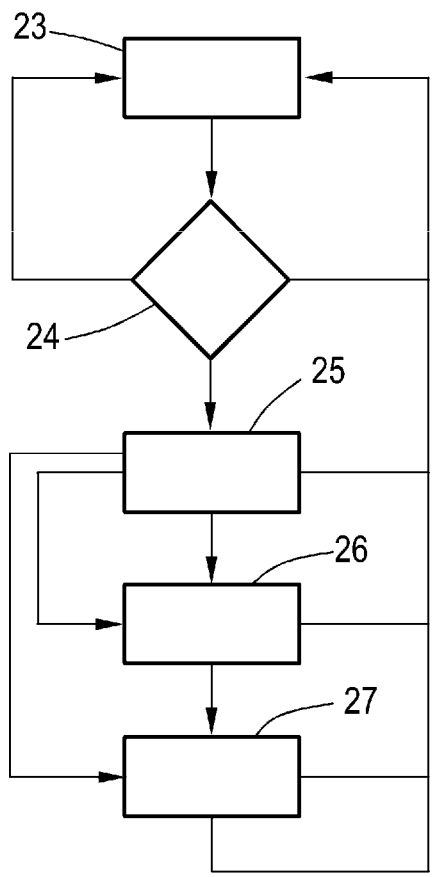

FIG. 6 a flow chart with the essential steps of a method according to the invention.

FIG. 1 shows a motor vehicle 1 comprising a navigation device 2 having at least one stored item of route information describing a route section and a cruise control system 3 that adjusts an actual speed of motor vehicle 1 to a stored target speed determined as a function of the stored item of route information by controlling a drive and braking device 4 of motor vehicle 1. The drive and braking device 4 comprises an internal combustion engine 5 and a braking device 6 having several brakes.

The cruise control system 3 is also designed to adjust the actual speed of the motor vehicle as a function of at least one evaluation parameter, on the basis of which a traversal of a changed route section earlier in time is qualified, either to the stored target speed determined as a function of the stored item of route information or to a changed target speed determined as a function of a changed item of route information that is supplied to navigation device 2 and relates to the changed route section.

The cruise control system 3 is thus able to adjust the actual speed of motor vehicle 1 either to the changed target speed or to the stored target speed as a function of the evaluation parameter.

FIG. 2 shows motor vehicle 1 from FIG. 1 in a first traffic situation. In the traffic situation shown in FIG. 2, motor vehicle 1 traverses route section 7, which has two curves 8 and 9. Motor vehicle 1 traverses route section 7 and approaches curve 8. There is a changed item of route information for route section 7. On the basis of this changed item of route information, a changed target speed is determined for motor vehicle 1 for curve 8. After motor vehicle 1 has traversed curve 8 at the changed target speed, the user of motor vehicle 1 has the ability to evaluate the traversal by means of an evaluation parameter. This provides the possibility of evaluating the traversal as pleasant or unpleasant and accepting the changed target speed accordingly, or increasing or decreasing it. It is also possible to automatically determine the evaluation parameter on the basis of sensor data that describes a lateral or longitudinal acceleration of the motor vehicle and a yaw rate of the motor vehicle.

In the further course of route section 7, it has a curve 9 that has already been traversed by another vehicle 10. The traversal of curve 9 by motor vehicle 10 need not take place directly before the curve is traveled by motor vehicle 1, but instead may have taken place at any time beforehand, with the proviso that the changed item of route information was already available for route section 7.

Using the traversal of curve 9 by the other motor vehicle 10, an evaluation parameter was created on the basis of the acceleration data and the yaw rate of motor vehicle 10 and the user input of the user of motor vehicle 10. This evaluation parameter is transmitted to motor vehicle 1 via a central server, whereupon the changed target speed for curve 9 of route section 7 can be adapted accordingly, and the actual speed can be adjusted to the adapted changed target speed. If motor vehicle 10 drove through curve 9 immediately before motor vehicle 1, it is also possible for the evaluation parameter to be transmitted directly to motor vehicle 1 by means of transmission from Car2Car or via a base station. The devices required for this are, of course, available in motor vehicles 10 and 1.

FIG. 3 shows motor vehicle 1 from FIG. 1 in a second traffic situation. In the traffic situation shown in FIG. 3, motor vehicle 1 traverses a route section 11 that has two curves 12 and 13. There is also a changed item of route information for route section 11, for which an evaluation parameter was already created by several motor vehicles 14. Changed route section 15 is shown by dashed lines. Changed route section 15 deviates only slightly from stored route section 11 here, relating to curve 12, meaning that the changed items of route information can be accepted directly in full. In this case, the average speed of the several motor vehicles 14, which was recorded when curve 12 was traversed, serves as an evaluation parameter.

In the diagram shown in FIG. 5, a speed distribution 16 is plotted, i.e., the number of individual vehicles for each speed at which a route section was traversed. Speed curve 16 is used only as an example here, and can differ for each route section. The average speed formed by the several motor vehicles 14 is denoted by reference character 17. In FIG. 3, it is transmitted to motor vehicle 1 from a central server as an evaluation parameter for curve 12. The average speed is then determined in motor vehicle 1 as a changed target speed for curve 12, and the actual speed of motor vehicle 1 is adjusted to it.

Along with the changed item of route information for route section 11, there is also a changed item of route information for curve 13. Due to a change in the traffic routing, curve 13 is now at a different location than specified in the stored route information saved in navigation device 2 of motor vehicle 1. This was qualified on the basis of the evaluation parameter of the several motor vehicles 14 for curve 13 and is transmitted to motor vehicle 1. A supplementation or replacement of the stored item of route information with the changed item of route information therefore occurs only selectively, because the changed location of the curve was accepted, but, due to unfavorable construction at the edge of the road and the associated poor visibility of curve 13, a traversal at the changed target speed calculated from the changed route information is not possible. Therefore, the stored target speed is replaced with the average speed 17 of the several motor vehicles 14, and the actual speed of motor vehicle 1 is adjusted to it.

FIG. 4 shows motor vehicle 1 from FIG. 1 in a third traffic situation. In FIG. 4, motor vehicle 1 traverses a route section 18 that has a curve 19. Curve 19 of route section 18 was traversed by several motor vehicles 14 that stored a speed curve 16 for curve 19 in a database on a central server. Such a speed curve 16 is shown in FIG. 5. The user of motor vehicle 1 has here selected a sports mode of motor vehicle 1. Thus, the actual speed of motor vehicle 1 is adjusted to a changed target speed that corresponds to a certain percentile of speed curve 16 from FIG. 5. According to this exemplary embodiment, an item of type information that corresponds to the 95th percentile is used for the sports mode. The driver of motor vehicle 1 therefore intends to drive through the curve faster than 95% of the drivers of the several motor vehicles 14.

FIG. 4 also shows a motor vehicle 20, the user of which has selected a comfort mode. According to this comfort mode, a target speed is selected for motor vehicle 20 that corresponds to the 40th percentile and is thus below the average speed 17 of the motor vehicles 14. In FIG. 5, the speed for the sports mode is indicated by reference character 21, and the speed for the comfort mode is indicated by reference character 22.

FIG. 6 shows a method for operating motor vehicle 1. The method begins in block 23 with the start of cruise control system 3. The actual speed of motor vehicle 1 is adjusted to a target speed determined as a function of the item of route information stored in navigation device 2. A check is then made in block 24 as to whether there is a changed item of route information for the route section traveled. If this is not the case, return branching is effected from block 24 to block 23, where the actual speed of motor vehicle 1 is adjusted according to the stored target speed determined by the stored item of route information. If there is a changed item of route information for the route section traveled, branching is effected from block 24 to block 25. A check is made in block 25 as to whether there is an evaluation parameter for the corresponding route section. First, a check is made as to whether there is an evaluation parameter that was created by means of an earlier traversal by motor vehicle 1, because this represents the preferred evaluation parameter, since it is input directly by the driver or was created by means of acceleration sensors of motor vehicle 1.

If such an evaluation parameter is present, the stored target speed or, otherwise, the changed target speed is used as a function of the evaluation parameter. This depends upon whether the user of motor vehicle 1 input the changed item of route information or the resulting changed target speed as being pleasant during the earlier traversal. Return branching is then effected from block 26 to block 24, where a check is made as to whether changed items of route information are also available for the other adjacent route sections. If this is the case, branching is effected again from block 24 to block 25. If this is not the case, branching is effected from block 24 to block 23, where the actual speed of motor vehicle 1 is adjusted to the stored target speed for the corresponding route sections.

If an evaluation parameter that was created by a traversal of the corresponding route section by the driver's own vehicle 1 is not present, branching is effected from block 25 to block 27, where a check is made as to whether an evaluation parameter of one or more other motor vehicles is present. If this is the case, this evaluation parameter is transmitted to motor vehicle 1.

In particular, if several motor vehicles 14 have driven through the corresponding route section and output an evaluation parameter, it is possible to determine the changed target speed with respect to the speed curve 16 obtained therefrom, as shown, for example, in FIG. 5. In block 27, it is also possible to check whether the driver of motor vehicle 1 has selected a driver profile, on the basis of which a certain deviation from average speed 17 of the several motor vehicles 14 is selected. A comfort mode or a sports mode, for example, would be conceivable here. Return branching is then effected from block 27 to block 24, where a check is made as to whether changed items of route information are also available for the adjacent route sections. If this is not the case, return branching is effected from block 24 to block 23, where the adjustment of the actual speed of motor vehicle 1 to the stored target speed is continued. If this is the case, branching is effected from block 24 to block 25, where the selection of the evaluation parameter is carried out again. The method can thus be carried out continuously or at fixed time intervals.

Of course, all advantages and details of the motor vehicle are also applicable to the method, and all method steps also apply when extrapolated to the motor vehicle.

The invention claimed is:

1. A method for operating a motor vehicle, comprising:
providing, by a navigation device, a stored item of route information describing a route section;
determining a stored target speed as a function of the stored item of route information;
adjusting, by a cruise control system, an actual speed of the motor vehicle to the stored target speed by controlling a drive or a braking device of the motor vehicle;
supplying, to the navigation device, a changed item of route information relating to a changed route section;
determining a changed target speed as a function of the changed item of route information;
qualifying an earlier traversal of the changed route section using an evaluation parameter, wherein the evaluation parameter incorporates a driving preference from the earlier traversal of the changed route section; and
adjusting, by the cruise control system and as a function of the evaluation parameter, the actual speed of the motor vehicle either to the stored target speed or to the changed target speed.

2. The method according to claim 1, further comprising:
creating, by another motor vehicle or several other motor vehicles, the evaluation parameter as a function of the earlier traversal of the changed route section; and
transmitting the evaluation parameter to the motor vehicle from the another motor vehicle or the several other motor vehicles.

3. The method according to claim 1, wherein the evaluation parameter further comprises at least one of a lateral acceleration of the motor vehicle, a yaw rate of the motor vehicle, a weighted average speed of several other motor vehicles, or an input by a user of the motor vehicle.

4. The method according to claim 1, further comprising:
storing at least two driver-specific items of type information in the cruise control system and/or a control device of the motor vehicle from which the evaluation parameter is derived;
creating, by several other motor vehicles, a speed distribution based on the earlier traversal of the changed route section;
determining various changed target speeds from the speed distribution; and
assigning the various changed target speeds to the at least two driver-specific items of type information.

5. The method according to claim 4, wherein each of the at least two driver-specific items of type information comprises a different changed target speed corresponding to the changed route section based on the input of the user of the motor vehicle.

6. The method according to claim 1, wherein the stored and/or the changed item of route information comprises at least one of a road width a road grade, a curve radius, or a construction at an edge of a roadway.

7. The method according to claim 1, further comprising:
changing, selectively, the stored item of route information to the changed item of route information; or
supplementing, selectively, the stored item of route information with the changed item of route information, with respect to at least one partial item of information, if the changed item of route information and/or the stored item of route information comprises multiple partial items of information.

8. The method according to claim 1, further comprising:
sending, by a Car2X and/or a radio and/or a data carrier and/or from a server, the changed item of route information and/or the evaluation parameter, to the navigation device and/or the cruise control system of the motor vehicle.

9. The method according to claim 1, further comprising:
displaying an instantaneously valid target speed and/or a target speed valid for an adjacent route section on a display device of the motor vehicle.

10. The method according to claim 1, wherein qualifying the earlier traversal of the changed route section comprises:
accepting or rejecting, by a user of the motor vehicle, the changed item of route information or the changed target speed corresponding to the changed route section.

11. The method according to claim 1, wherein qualifying the earlier traversal of the changed route section comprises:
increasing or decreasing, by a user of the motor vehicle, the changed target speed corresponding to the changed route section.

12. A motor vehicle, comprising:
a navigation device, wherein the navigation device comprises a stored item of route information describing a route section; and is supplied with a changed item of route information relating to a changed route section; and
a cruise control system, wherein the cruise control system is configured to:
adjust an actual speed of the motor vehicle to a stored target speed, wherein the stored target speed is determined as a function of the stored item of route information by controlling a drive or a braking device of the motor vehicle; and
adjust the actual speed of the motor vehicle either to the stored target speed or to a changed target speed as a function of an evaluation parameter, wherein:
the changed target speed is determined as a function of the changed item of route information;
the evaluation parameter incorporates a driving preference from an earlier traversal of the changed route section; and
the earlier traversal of the changed route section is qualified using the evaluation parameter.

13. The motor vehicle according to claim 12, further comprising the evaluation parameter created by another motor vehicle or several other motor vehicles as a function of the traversal of the changed route section, wherein the evaluation parameter is transmitted to the motor vehicle from the another motor vehicle or the several other motor vehicles.

14. The motor vehicle according to claim 13, wherein the changed item of route information and/or the evaluation parameter is sent to the navigation device and/or the cruise control system of the motor vehicle by means of a Car2X and/or a radio and/or a data carrier and/or from a server.

15. The motor vehicle according to claim 12, wherein the evaluation parameter further comprises at least one of a lateral acceleration of the motor vehicle, a yaw rate of the motor vehicle, a weighted average speed of several other motor vehicles, or an input by a user of the motor vehicle.

16. The motor vehicle according to claim 12, wherein the cruise control system is further configured to:
  store at least two driver-specific items of type information from which the evaluation parameter is derived;
  determine various changed target speeds from a speed distribution, wherein the speed distribution is created by several other motor vehicles based on the earlier traversal of the changed route section; and
  assign the various changed target speeds to the at least two driver-specific items of type information.

17. The motor vehicle according to claim 16, wherein each of the at least two driver-specific items of type information comprises a different changed target speed corresponding to the changed route section based on the input of the user of the motor vehicle.

18. The motor vehicle according to claim 12, wherein the stored and/or the changed item of route information comprises a road width and/or a road grade and/or a curve radius and/or a construction at an edge of a roadway.

19. The motor vehicle according to claim 12, wherein the changed item of route information and/or the stored item of route information comprises multiple partial items of information, so that changing the stored item of route information to the changed item of route information and/or supplementing the stored item of route information with the changed item of route information is done only selectively, with respect to at least one partial item of information.

20. The motor vehicle according to claim 12, further comprising:
  a display device configured to display an instantaneously valid target speed and/or a target speed valid for an adjacent route section.

\* \* \* \* \*